(12) United States Patent
MacGregor et al.

(10) Patent No.: US 7,692,429 B2
(45) Date of Patent: Apr. 6, 2010

(54) ELECTROMAGNETIC DETECTOR FOR MARINE SURVEYING

(75) Inventors: Lucy MacGregor, Edinburgh (GB); David Charles Newall Pratt, Glasgow (GB); Jonathan Harvey Nicholls, Aberdeen (GB); Martin C. Sinha, Southampton (GB)

(73) Assignee: OHM Limited, Aberdeen (GB)

( * ) Notice: Subject to any disclaimer, the term of this patent is extended or adjusted under 35 U.S.C. 154(b) by 35 days.

(21) Appl. No.: 12/137,134

(22) Filed: Jun. 11, 2008

(65) Prior Publication Data

US 2008/0309346 A1 Dec. 18, 2008

(30) Foreign Application Priority Data

Jun. 15, 2007 (GB) .................. 0711637.9

(51) Int. Cl.
 *G01V 3/02* (2006.01)
(52) U.S. Cl. .................. 324/365; 324/334; 324/357
(58) Field of Classification Search ................ 324/365, 324/334, 357
See application file for complete search history.

(56) References Cited

U.S. PATENT DOCUMENTS 5,770,945 A 6/1998 Constable

FOREIGN PATENT DOCUMENTS

| GB | 2382875 A | 6/2003 |
|---|---|---|
| GB | 2390904 A | 1/2004 |
| GB | 2402745 A | 12/2004 |
| GB | 2411006 A | 8/2005 |
| GB | 2423370 A | 8/2006 |
| RU | 2298802 C2 | 5/2007 |
| WO | 03104844 A1 | 12/2003 |
| WO | 2004053528 A1 | 6/2004 |
| WO | 2006026361 A1 | 3/2006 |
| WO | 2007018810 | 2/2007 |

OTHER PUBLICATIONS

International Search Report for Corresponding International Patent Application No. PCT/GB2008/001925.
Written Opinion for Corresponding International Patent Application No. PCT/GB2008/001925.

(Continued)

*Primary Examiner*—Reena Aurora
(74) *Attorney, Agent, or Firm*—Locke Lord Bissell & Liddell LLP

(57) ABSTRACT

A detector for underwater electromagnetic surveying is described. The detector comprises first, second, third and fourth electrodes which are arranged to define first, second and third electric dipole antennae extending between pairs of the electrodes. Each dipole antennae extends between a pair of the electrodes and the fourth electrode is common to all three dipole antennae. Thus the first electrode is separated from the fourth electrode along a first direction to provide the first dipole antenna, the second electrode is separated from the fourth electrode along a second direction to provide the second dipole antenna, and the third electrode is separated from the fourth electrode along a third direction to provide the third dipole antenna. The electrodes are arranged so that the first, second and third directions are inclined at an angle of between 20 and 70 degrees to a surface on which the detector rests when in normal use.

25 Claims, 7 Drawing Sheets

OTHER PUBLICATIONS

MacGregor, L., Andreis, D., Tomlinson, J. and Barker, N. "Controlled-source electromagnetic imaging on the Nuggets-1 reservoir." The Leading Edge, Aug. 2006, p. 984-992.

Moser, J., Poupon, M., Meyer, H., Wojcik, C. and Rosenquist, M. "Integration of electromagnetic and seismic data to assess residual gas risk in the toe-thrust belt of deepwater Niger Delta." The Leading Edge, Aug. 2006, p. 977-992.

Srnka, L., Carazzone, J., Eriksen, E. and Ephron, M. "Remote Reservoir Resistivity Mapping—An Overview." ExxonMobil Exploration Company and Sonangol.

Sinha, M., Patel, P., Unsworth, M., Owen T. and MacCormack, M. "An Active Source Electromagnetic Sounding System for Marine Use." Marine Geophysical Researches, 1990, vol. 12, p. 59-68, Kluwer Academic Publishers.

Constable, S. and Cox, C. "Marine controlled-source electromagnetic sounding 2. The PEGASUS experiment." Journal of Geophysical Research, Mar. 10, 1996, vol. 101, No. B3, p. 5519-5530, American Geophysical Union.

Webb, S., Constable, S., Cox, C. and Deaton, T. "A Seafloor Electric Field Instrument." Journal of Geomagnetism and Geoelectricity, 1985, vol. 37, p. 1115-1129.

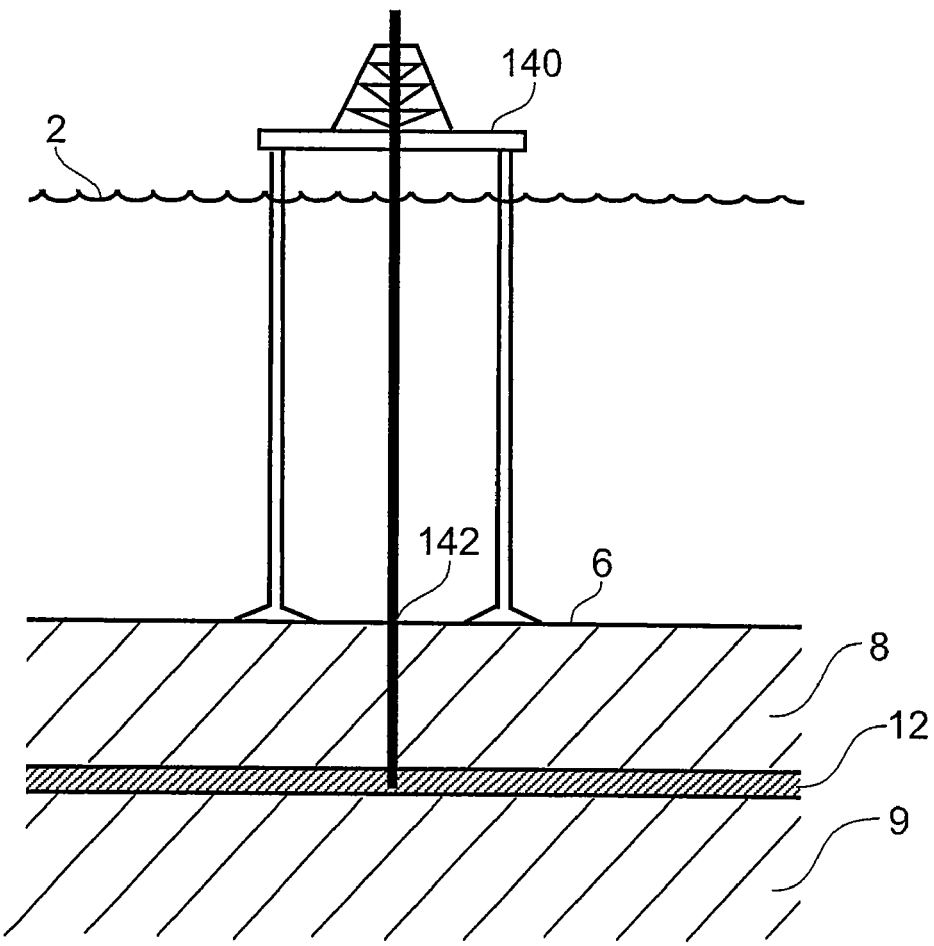
Fig. 12
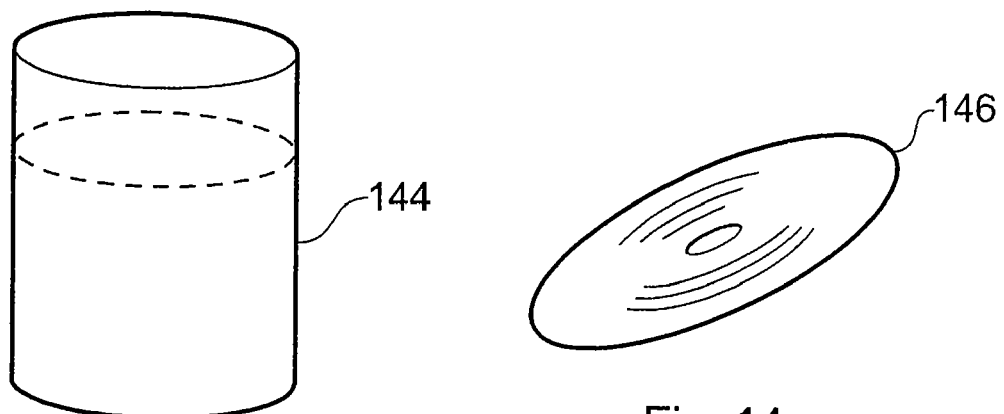
Fig. 13
Fig. 14

ELECTROMAGNETIC DETECTOR FOR MARINE SURVEYING

BACKGROUND OF THE INVENTION

The invention relates to seafloor electromagnetic detectors (receivers) for surveying for resistive and/or conductive bodies, for example for oil and other hydrocarbon reserves, or subterranean salt bodies.

FIG. 1 schematically shows a surface vessel 14 undertaking controlled source electromagnetic (CSEM) surveying of a subterranean strata configuration according to one standard technique [1]. The subterranean strata configuration in this example includes an overburden layer 8, an underburden layer 9 and a hydrocarbon reservoir 12. The surface vessel 14 floats on the surface 2 of a body of water, in this case seawater 4 of depth h meters. A submersible vehicle 19 carrying a source in the form of a horizontal electric dipole HED transmitter 22 is attached to the surface vessel 14 by an umbilical cable 16. This provides an electrical and mechanical connection between the submersible vehicle 19 and the surface vessel 14. The HED transmitter is supplied with a drive current so that it broadcasts an HED electromagnetic (EM) signal into the seawater 4. The HED transmitter is typically positioned a height of around 50 meters or so above the seafloor 6.

One or more remote receivers 25 are located on the seafloor 6. The receivers are sensitive to EM fields induced in their vicinity by the HED transmitter, and record signals indicative of these fields for later analysis.

Another type of submarine EM survey is a passive, e.g. magnetotelluric (MT), survey. These types of survey employ similar receivers to those used in CSEM surveying and shown in FIG. 1, but do not employ a controlled source to generate the EM fields (i.e. they do not employ a transmitter 22 such as shown in FIG. 1). Passive source EM surveys are instead based on detecting the response of subterranean strata to naturally occurring broadband MT waves generated in the earth's ionosphere. There are some differences in the EM fields used in an MT survey and the EM fields typically generated in a CSEM survey, most notably in terms of frequency content, but the receivers used in these types of survey are broadly similar. Indeed, in some surveys both CSEM and MT data may be collected using the same receivers.

In performing a survey such as shown in FIG. 1, the HED transmitter 22 is driven to broadcast EM signals that propagate both into the overlying water column 4 and downwards into the seafloor 6, and the underlying strata 8, 9, 12. At practical frequencies for this method, and given the typical resistivity of the respective media 4, 8, 9, 12, propagation occurs primarily by diffusion of EM fields. The rate of decay in amplitude and change in phase of the signal are controlled both by geometric spreading and by skin depth effects. Because in general the underlying strata 8, 9, 12 are more resistive than the seawater 4, skin depths in the underlying strata 8, 9, 12 are longer. As a result, electromagnetic fields measured by a receiver located at a suitable horizontal separation are dominated by those components of the transmitted EM signal which have propagated downwards through the seafloor 6, along within the underlying strata and back up to the detector, rather than directly through the seawater.

A sub-surface structure which includes a hydrocarbon reservoir, such as the one shown in FIG. 1, gives rise to a measurable change in the EM fields (amplitude and phase) measured at a receiver relative to a sub-surface structure having only water-bearing sediments. For relatively resistive bodies in water bearing sediments, such as a hydrocarbon reservoir, the EM fields are generally enhanced in amplitude and advanced in phase. This is because EM signals are less attenuated and travel faster in resistive bodies. By way of comparison, a hydrocarbon reservoir typically has a relatively high resistivity (e.g. up to 100 Ωm or even higher) compared to other subterranean strata (typically on the order of 1 Ωm or so). It is this effect on electromagnetic fields which has been used as a basis for detecting hydrocarbon reservoirs [1]. Conversely, for relatively conductive structures in water bearing sediments, such as those saturated with briney fluids, the EM fields are generally reduced in amplitude and retarded in phase. This is because EM signals are more attenuated and travel more slowly in relatively more conductive bodies.

Thus an important aspect of CSEM surveying is an ability to record EM fields at the seafloor as reliably as possible. Field measurements for marine EM surveying applications are primarily made using receivers/detectors which may be grouped into two main types. One type may be referred to as stand alone seafloor deployed detector units, and the other type may be referred to as long-wire detectors.

Long-wire detectors (also widely known as LEM instruments) have a single long (up to 3 km) antenna deployed on the seafloor behind an instrument for recording the signals picked up in the antenna. Examples of this type of detector are described by Webb [2] and Constable [3]. Although good signal to noise ratios can be achieved with these instruments, they are time consuming to deploy since they must be deep-towed through the water column and released close to the seafloor. Accordingly, stand alone seafloor deployed detector units are often preferred.

FIG. 2 schematically shows in perspective view a known stand alone seafloor deployed type detector 25. The detector is described in detail in WO 03/104844[4]. The detector is primarily described in the context of magnetotelluric (MT) surveying. However, this type of detector is also used in CSEM surveying. A similar detector is described in U.S. Pat. No. 5,770,945[5], and further broadly similar examples are described by Sinha [6] and in GB 2 402 745 [7].

The detector 25 shown in FIG. 2 may be considered to comprise four main components. The first component, the logger unit, includes a multi-channel digital data-logging processor, magnetic field post amplifier and electric field amplifiers, all contained within a first waterproof pressure case 30. The second component is a second waterproof pressure case 32 containing an acoustic navigation/release system. The third component consists of four silver-silver chloride (Ag—AgCl) electrodes 34, 35, 36, 37 mounted on the ends of four 5-meter long booms 40, 41, 42, 43, and two silver-silver chloride (Ag—AgCl) electrodes 45, 46 located at different positions along the length of vertical arm 48. The fourth unit includes four magnetic induction coil sensors (of which three are visible in FIG. 2) 51, 52, 53. All elements of the system are mounted on or attached to a corrosion-resistant frame 56 along with glass spheres 58 for flotation, and an anchor weight 60 for deployment to the seafloor.

The booms 40, 41, 42, 43 comprise 5 m lengths of semi-rigid plastic (e.g., PVC or polypropylene) pipe, with a diameter on the order of 2 inches (5.08 cm). Insulated copper wires (not shown) are run through the pipes to connect the electrodes 35, 36, 37, 38 to the amplifiers in the logger unit. Alternatively the booms 40, 41, 42, 43 may be formed from solid rods, such as fiberglass or other durable material, which have diameters on the order of 1 to 2 cm or more. In these embodiment, the electrodes 34, 35, 36, 37 are retained on the outside of their respective booms, and the insulated wires for connection to the amplifiers run along the outer surface of the rods, preferably anchored at points along the boom length using fasteners such as clamps or cable ties.

The electrodes 45, 46 on the vertical arm 48 are for detection of a vertical electric field component. The vertical arm is inserted into a mount on the frame 56 and fastened via appropriate fastening means so that it extends vertically above the frame and the electrical components of the unit. The vertical arm 48 is a substantially rigid material in the form of a pipe or rod. To obtain the desired rigidity, arm 162 is formed from polycarbonate resin or a similar durable plastic. The electrodes 45, 46 are disposed at different points along the length of the vertical arm 48 to form a vertically-oriented dipole antenna. The electrodes 45, 46 on the vertical arm are connected respectively by insulated wires and cable to the data logger included within the electronics pressure case 30.

FIG. 3 schematically shows in perspective view another stand alone seafloor deployed type detector 70. This type of detector may be seen as a variation on the detector shown in FIG. 2 and is described in detail in WO 06/026361 A1 [8]. Apart from differences in the electrode structure, the detector of FIG. 3 is otherwise the same as the detector shown in FIG. 2. The electrode structure is different in that instead of electrodes mounted on booms, the electrode structure comprises three pairs of square Ag—AgCl electrodes. The three pairs of electrodes are orthogonally arranged so that each pair is for measuring respective EM fields along two horizontal (x and y) and one vertical (z) direction. The electrodes in each pair are positioned parallel to each other such that together the six electrodes form a cuboid shape. The electrodes in each pair are connected together by a resistor (not shown in FIG. 3) having a resistance value selected to match the resistance of seawater between the electrodes. The electrodes are retained within a frame through which connectors 74 are passed to connect the electrodes to cables 72 located external to the assembly. The cables provide connections from the electrodes to their corresponding amplifiers 76 and a data-logging processor 78. This electrode configuration and the use of the resistors is said to reduce distortion of the measured electric fields in the seawater.

Conventional detectors for EM surveying suffer from a number of problems.

For short arm (boom) instruments (i.e. for stand alone seafloor deployed type detectors as shown in FIG. 2) the arms are generally only semi-rigid and so prone to flexing. The present inventors have appreciated that this makes it difficult to accurately determine the orientation of the dipole antennae comprising the detector on the seafloor. This can be problematic because valuable information regarding the subterranean strata can be obtained using full vector information on measured EM fields (i.e., by taking account of the directions of EM fields, as well as their amplitudes and phases). For example, directional information is important both for characterizing subterranean strata having variations within horizontal layers, and also for distinguishing different background strata configurations, even in cases where the strata are largely one-dimensional (horizontally layered). This is because directional information allows transverse electric (TE) and transverse magnetic (TM) modes in the transmitted fields (which modes are differently sensitive to different subterranean strata configurations) to be distinguished at the detector [1]. Furthermore, inaccurate orientation information causes problems in accurately determining spatial gradients in EM fields which are important in some analysis schemes because they are particularly sensitive to lateral structural variations in subterranean strata, and may also be used to de-convolve measured fields into "pure" TE and "pure" TM components which are more amenable to some types of further analysis, e.g., as described in GB 2 411 006 A [9] and GB 2 423 370 [10] (the raw EM field data are in general mixed mode for arbitrary source orientations and detector locations).

Accurate orientation information is difficult to obtain for detectors of the type shown in FIG. 2 because while the orientation of the main body of the unit may be determined using an appropriate on-board compass device, the booms themselves will typically have flexed during their descent through the water column. Because of this when the detector units and their booms come to rest on the seafloor, the electrodes at their ends are moved away from their assumed (nominal) positions with respect to the frame of the receiver. This means the orientation of the receiver dipoles provided by the electrodes is typically not known to an accuracy of any better than 5 degrees or so, whereas 1 degree accuracy or better is desired for accurate use of orientation information.

Furthermore, the semi-rigid nature of the booms of detectors such as shown in FIG. 2 renders them prone to motionally induced noise. Boom motion induces noise in two ways. Firstly, it causes changes in the direction along which electric fields are measured, and secondly the movement of the antennae and their associated cabling through the Earth's magnetic field induces electric fields in the measurement channels. These effects can mean motionally induced noise becomes the dominant source of noise, especially in shallow water and areas with extreme seafloor currents.

A further problem with known marine EM surveying detectors arises from the fact that the signals to be measured are extremely small. For example, electric fields at the detector are typically on the order of only a nanoVolt/meter or so. This can be particularly problematic for stand alone seafloor deployed type detectors such as shown in FIGS. 2 and 3 since the relatively small scale of these detectors (compared to long-wire detectors) means the voltage difference between their electrodes will typically be only 10 nV or so (for electrodes separated by 10 m). The difficulty in measuring such small voltages is exacerbated by the remote location and the hostile environment in which detectors are located. Thus the signals to be measured can easily become contaminated by noise arising from connectors and cabling to the extent that the signals can become completely lost in noise if the connectors become worn or corroded by seawater.

What is more, the field components measured at the detector along different direction are likely to differ significantly from one another, with signals on the order of a nanoVolt/meter only likely for the strongest signal components. Other signal components can be much weaker. For example, the detectors shown in FIGS. 2 and 3 measure signals in two orthogonal horizontal directions and a vertical direction. For the electric fields in a marine EM survey, the fields at a detector will predominantly be in a generally horizontal direction. The particular direction within the horizontal plane will depend primarily on the nature and direction of the source of the fields relative to the detector. The relative intensities of the three field components measured at a detector will depend on the orientation of the detector with respect to the direction of the induced fields in its vicinity. For example, the vertical component will almost always be particularly weak because there is generally little vertical signal. The vertical component might, for example, by a number of orders of magnitude weaker that the horizontal components. Furthermore, one or other of the measured horizontal components may be similarly weak if the detector is oriented with one of its antenna aligned closely with the direction of the EM fields (leading to a relatively strong signal component), and one of its antennae orthogonal thereto (leading to a relatively weak signal component). This variation in the signal strengths associated with different spatial components means there is a corresponding wide range in associated signal-to-noise ratios. When combining signals from the three spatial directions to obtain a resultant measure of the fields at the detector, the overall accuracy can be strongly affected by the poor signal-to-noise ratio in the weakest signal component, thus reducing the overall accuracy of the measurement.

Accordingly there is a need for a detector for marine EM surveying which is easier to deploy than known long-wire type detectors, but which does nor suffer the above-mentioned drawbacks of known stand alone seafloor deployed type detectors.

SUMMARY OF THE INVENTION

According to a first aspect of the invention there is provided a detector for underwater electromagnetic surveying. The detector comprises first, second, third and fourth electrodes arranged to define first, second and third electric dipole antennae respectively extending between pairs of the electrodes. The first electrode is separated from the fourth electrode along a first direction to provide the first dipole antenna, the second electrode is separated from the fourth electrode along a second direction to provide the second dipole antenna, and the third electrode is separated from the fourth electrode along a third direction to provide the third dipole antenna. The electrodes are further arranged so that the first, second and third directions are inclined at an angle of between 20 and 70 degrees to a surface on which the detector rests when in normal use.

Thus the detector is operable to measure electric fields along three directions, none of which are closely aligned with the horizontal or vertical directions. This means the full vector electric field can be determined at the detector (i.e. amplitude, phase and direction) from three measured electric field components which are more comparable to one another in magnitude than seen with known detectors as discussed above. This is because none of the detected electric field components are closely aligned with the typically much weaker vertical electric field component induced at the detector. Furthermore, this is achieved using only four electrodes since the fourth electrode is an electrode which is common to all three electric dipole field measurements.

The electrodes may be arranged so that the first, second and third directions are inclined at an angle to a surface on which the detector rests when in normal use in a range selected from the group comprising 30 to 60 degrees, 25 to 50 degrees, and 30 to 40 degrees.

The electrodes may further be arranged so that the first, second and third directions are inclined at substantially the same angle to a surface on which the detector rests when in normal use. In this configuration it is more likely that electric fields on the same order of magnitude will be measured along each of the first, second and third directions. There will still in general be variations in the signal magnitudes seen along the three different directions which depend on the angular orientation of the detector about a vertical axis compared to the orientation and direction to an electromagnetic source, but the dipole antennae will be similarly biased towards the weaker vertical electric field component.

For example, the electrodes may be arranged so that the first, second and third directions are each inclined at an angle of around 35 degrees or so to a surface on which the detector rests when in normal use (e.g. the seafloor, or floor of other body of water, or a platform on which the detector is positioned during use). This angle permits the three dipole antennae of substantially equal length to be at the same angle to the horizontal and also to meet at right angles to one another at the common fourth electrode, with the fourth electrode located uppermost. Having the fourth electrode uppermost in normal use can be helpful in providing a compact and stable overall shape to the detector. If the three dipoles are mutually orthogonal, it can be easier to rotate the measured fields into spatial components of interest during later analysis as there is less cross-contamination between the three measured components of the electric field. (Identical length dipoles that are orthogonal to one-another will subtend an angle to the horizontal of arctan(sqrt(2)/2), which is 35.2644 degrees).

If the detector is arranged in normal use so that the fourth electrode is lowermost, the first, second and third directions may preferentially be inclined at an angle of around 55 degrees to the surface on which the detector rests during normal use. For this configuration an angle of 55 degrees or so again permits three dipole antennae of substantially equal length to be at the same angle to the surface and also to meet at right angles.

In embodiments where the electrodes are arranged so that the first, second and third directions are not arranged so that the first, second and third directions are each inclined at the same angle to a surface on which the detector rests when in normal use, it may still be advantageous for the three directions to be orthogonal to one another.

The detector may further comprise a plurality of measurement channels to which the electrodes are coupled.

The plurality of measurement channels to which the electrodes are coupled may comprise first, second, and third potential difference measurement circuits operable to respectively measure the potential difference between the first and fourth electrodes, the second and fourth electrodes, and the third and fourth electrodes. Alternatively, the plurality of measurement channels to which the electrodes are coupled may comprise first, second, third and fourth electric potential measurement circuits operable to respectively measure the electric potential of the first, second, third and fourth electrodes.

The electrodes may be coupled to the measurement channels by an electrical connection path that does not include detachable plug-and-socket connectors. This can help reduce noise since poor electrical contacts in plug-and-socket connectors has been found by the inventors to be a significant source of noise. For example, the electrodes may be directly connected to the measurement channels by cables or solid (e.g. bar or rod) conductors soldered to the electrodes and to corresponding input terminals of the measurement channels.

Noise may further be reduced if the electrodes are electrically coupled to the measurement channels by a material which is matched to that of the electrodes, for example, the electrodes may be silver-silver chloride electrodes and the material connecting them to the signal processing unit may be metallic silver.

The dipole antennae may have lengths of between 0.5 and 5 meters, for example 1 and 2 meters. This sort of size has been found to provide a good balance between having dipoles that are sufficiently long that a reasonable signal can be detected, but no so long that the detectors become unwieldy and difficult to store on ship and/or deploy. Nonetheless, the dipole lengths (i.e. the separation between the relevant pairs of electrodes comprising the detector) could well be anything up to 10 or 20 meters or longer in length.

The detector may comprises a rigid frame having a generally triangular pyramidal form, wherein the electrodes are mounted towards vertices of the frame. By mounting the electrodes on a frame of this form, the overall dipole structure may be more rigid than for electrodes mounted on booms as described above.

The fourth electrode may be mounted towards an uppermost vertex of the frame (or uppermost with respect to the first, second and third electrodes regardless of the form of the frame) when the detector is in normal use. By having the first, second and third electrodes (which are spatially separated from one another) lowermost, a stable base for the detector can readily be provided in a relatively compact detector.

The detector may furthermore comprise a ballast weight to prevent it from floating during normal use. The weight may be positioned with respect to the electrodes so that if the detector is deployed by being dropped through a water column, the weight tends to bias the detector orientation during its decent so that when it settles on the surface on which it will rest during use (e.g. seafloor), the first, second and third directions are inclined at an angle of between 20 and 70 degrees to the surface. Thus appropriate inclinations for the dipole antennae may be readily achieved with this form of deployment without requiring in-situ re-orientation.

The detector may further comprise a floatation device and the ballast weight may be remotely detachable. Thus if the ballast weight is released (i.e. after completion of a survey), the floatation device may carry the detector to the water surface for recovery. The floatation device may also be positioned so as to bias the detector orientation during deployment so that when it settles on the surface on which it will rest during use, the first, second and third directions naturally tend to be inclined at an angle of between 20 and 70 degrees to the surface (i.e. the floatation device and/or ballast weights are arranged to ensure the detector does not land on its side with respect to its intended in-use orientation).

The detector may further comprise a compass and/or an inclinometer to record its orientation on the seafloor. This can assist in resolving measured field components into desired directions for analysis, e.g. for resolving the measured fields into horizontal and vertical components.

The detector may comprise a fifth electrode mounted between the first and fourth electrodes. This allows two spatially separated measurements of electric field to be measured along the first direction. Not only can this improve measurement statistics, but the two spatially separated measurements of electric field can allow for a determination of the local gradient in the field. This can be useful for some analysis schemes, for example those described in GB 2 411 006 A [9] and GB 2 423 370 A [10].

Similarly, the detector may comprise a sixth electrode mounted between the second and fourth electrodes and/or a seventh electrode mounted between the third and fourth electrodes.

The detector may also comprise magnetic field sensors for measuring magnetic fields. This can allow a full characterization of the EM fields in the vicinity of the detector. The magnetic field sensors may also be arranged to measure fields along directions which are inclined at an angle of between 20 and 70 degrees to the horizontal for reasons similar to those discussed above for the electric fields.

According to a second aspect of the invention there is provided a marine electromagnetic survey method comprising: deploying a source operable to transmit an electromagnetic signal; deploying a detector operable to measure electric fields along first, second and third directions inclined at an angle of between 20 and 70 degrees to the horizontal, wherein the detector comprises first, second, third and fourth electrodes arranged so that the first electrode is separated from the fourth electrode along the first direction to allow for the measurement of electric field along the first direction, the second electrode is separated from the fourth electrode along the second direction to allow for the measurement of electric field along the second direction, and the third electrode is separated from the fourth electrode along the third direction to allow for the measurement of electric field along the third direction; transmitting an electric signal using the source; and obtaining electric field data along the first, second and third directions using the detector.

According to a third aspect of the invention there is provided a method for obtaining hydrocarbon from an area that contains a subterranean hydrocarbon reservoir, comprising: providing survey data from an electromagnetic survey of the area performed using a detector according to the first aspect of the invention; analyzing the survey data to identify the subterranean hydrocarbon reservoir; penetrating the subterranean hydrocarbon reservoir with a hydrocarbon-producing well; and extracting hydrocarbon from the subterranean hydrocarbon reservoir using the hydrocarbon-producing well.

Thus there may be provided a volume of hydrocarbon obtained from an area that contains a subterranean hydrocarbon reservoir, the hydrocarbon obtained by: providing survey data from an electromagnetic survey of the area performed using a detector according to the first aspect of the invention; analyzing the survey data to identify the subterranean hydrocarbon reservoir; penetrating the subterranean hydrocarbon reservoir with a hydrocarbon-producing well; and extracting the volume of hydrocarbon from the subterranean hydrocarbon reservoir using the hydrocarbon-producing well.

There may further be provided a results data set representing an area that is thought or is known to contain a subterranean hydrocarbon reservoir, the results data set obtained by: performing an electromagnetic survey of the area using a detector according to the first aspect of the invention; and generating the results data set based on data obtained during the survey. The results data set may, for example, comprise raw or pre-processed EM field data (e.g. electric/magnetic field as a function of time, or as a function of offset between the detector and a transmitting source), from one or from a number of sources. Alternatively, the results data set may comprise an output from an analysis of the raw data set, for example the output of an inversion or other analysis.

There may also be provided a computer readable storage medium having a results data set according to the fourth aspect of the invention recorded thereon.

BRIEF DESCRIPTION OF THE DRAWINGS

For a better understanding of the invention and to show how the same may be carried into effect reference is now made by way of example to the accompanying drawings, in which:

FIG. 12 is a schematic view of an oil rig producing hydrocarbon;

FIG. 13 is a schematic perspective view of a barrel containing a volume of hydrocarbon; and FIG. 14 is a schematic perspective view of a data storage medium bearing a data set.

DETAILED DESCRIPTION

Figure 1:
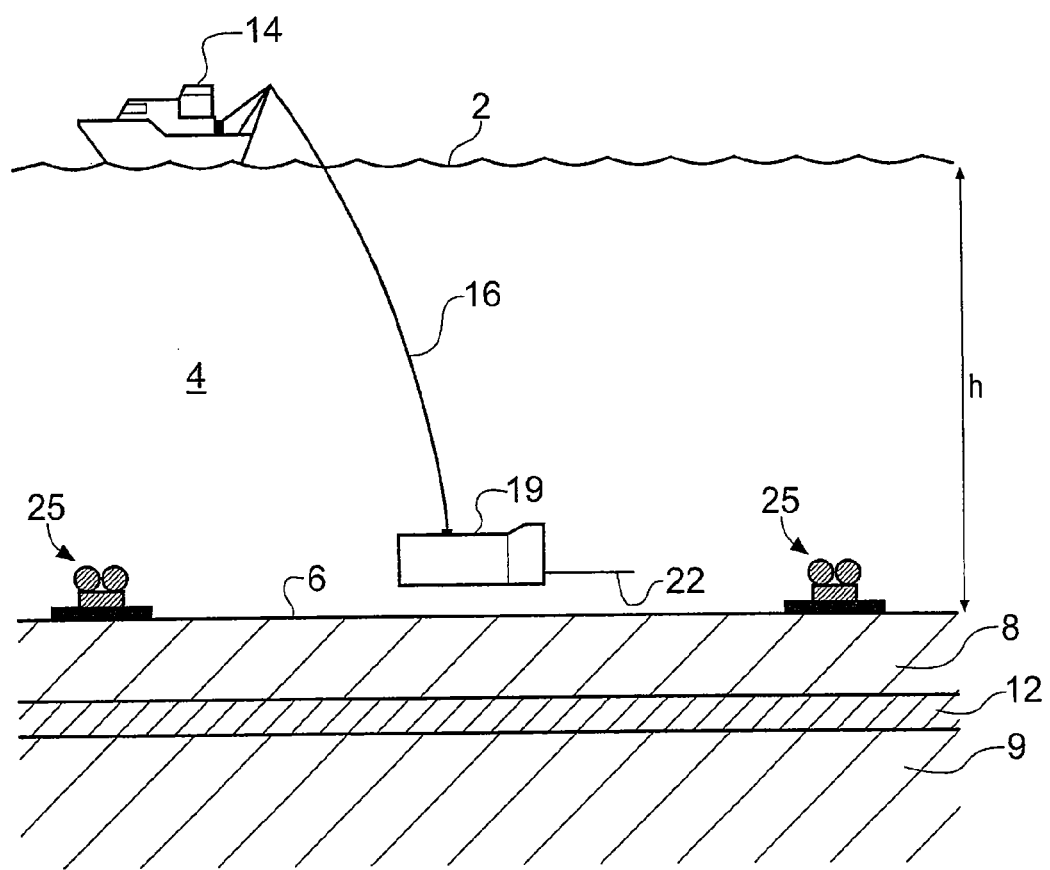
FIG. 1 shows in schematic vertical section a surface vessel undertaking an EM survey according to standard techniques.
Figure 2:
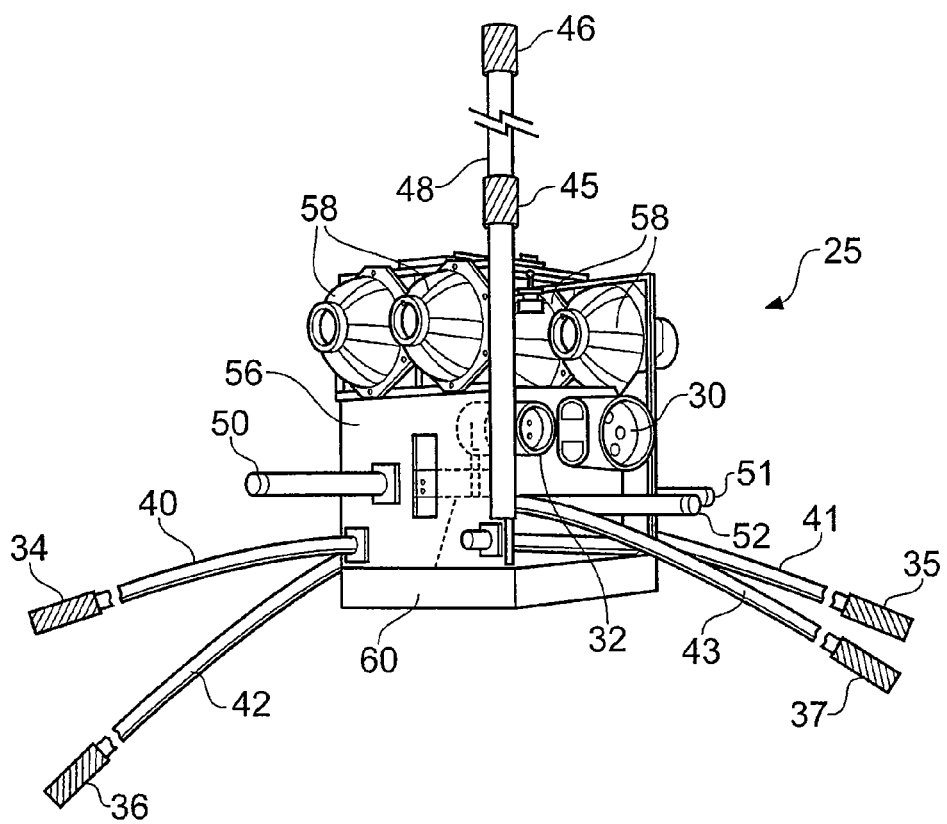
FIGS. 2 and 3 schematically show in perspective view examples of known detectors for marine EM surveying.
Figure 3:
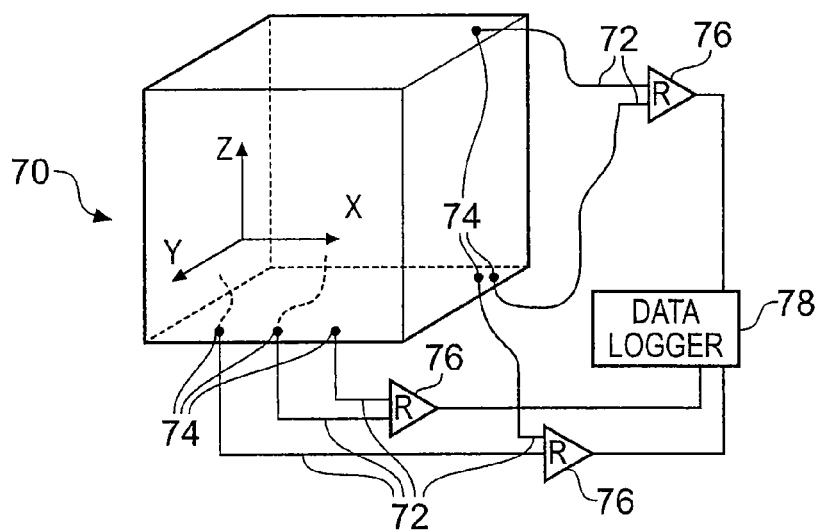
Figure 4:
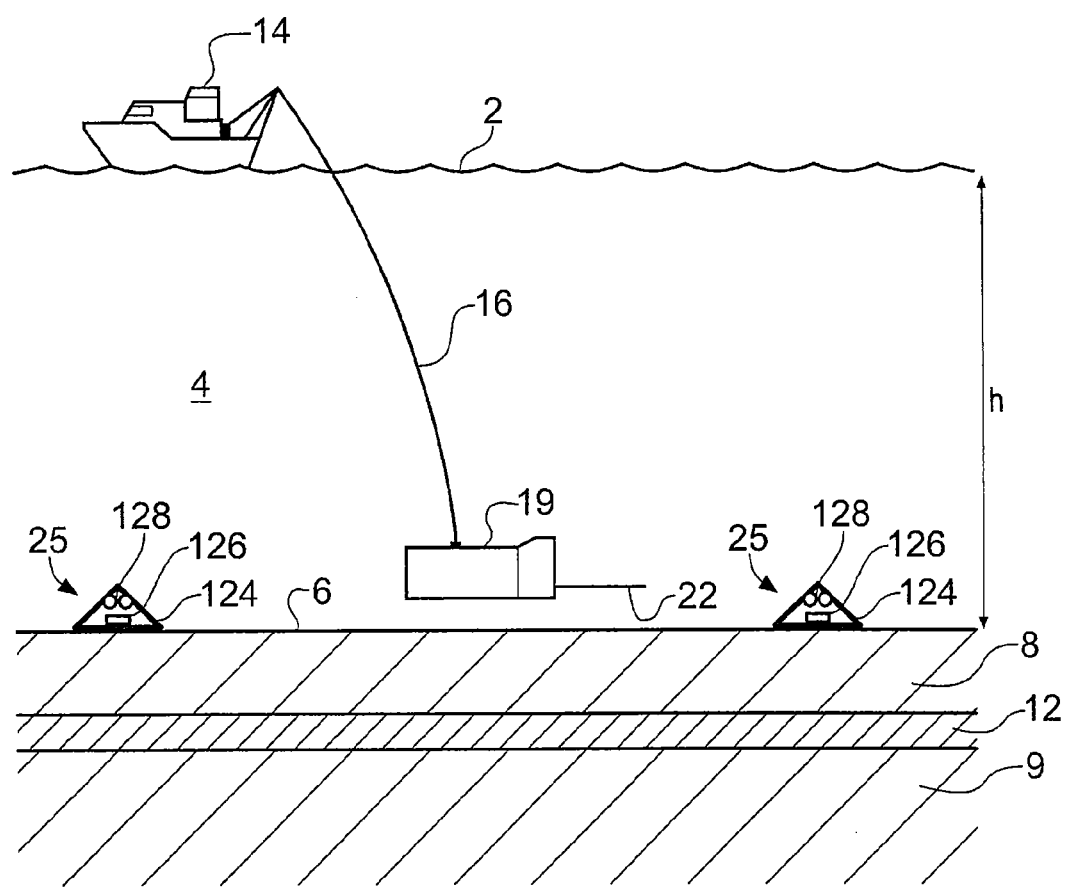
FIG. 4 shows in schematic vertical section a surface vessel undertaking an EM survey according to an embodiment of the invention.

FIG. 4 schematically shows a surface vessel 14 undertaking controlled source electromagnetic (CSEM) surveying of a subterranean strata configuration using EM detectors 125 according to an embodiment of the invention. Features of FIG. 4 which are similar to and will be understood from corresponding features of FIG. 1 are indicated by the same reference number. Thus the surface vessel 14 floats on the surface 2 of a body of seawater 4 of depth h meters. A submersible vehicle 19 carrying a source in the form of an HED transmitter 22 is attached to the surface vessel 14 by an umbilical cable 16 providing an electrical and mechanical connection between the submersible vehicle 19 and the surface vessel 14. The HED transmitter is supplied with a drive current so that it broadcasts an HED EM signal into the seawater 4. The HED transmitter is typically around 50 meters above the seafloor 6. The surface vessel 14, submarine 19, umbilical 16 and HED transmitter 22 may be conventional.

One or more remote detectors (receivers) 125 are located on the seafloor 6. Each of the receivers 125 includes a data-logging unit 126, an antenna array 124 comprising a plurality of antenna units, a floatation device 128 and a ballast weight (not shown). The antenna array 124 for each detector comprises three orthogonal dipole antenna units aligned with directions which meet at an apex towards the top of the detector when normally deployed. Thus the three dipole antenna units are arranged along the rising edges of a tetrahedral-like structure (i.e. a structure having a generally triangular pyramidal form) having a base on the seafloor. The structure is not a strict geometric tetrahedron in this embodiment (although it could be in others) in that the dipole antenna units are orthogonal to one another (i.e. the directions of extent of the dipole antennae comprising the respective dipole antenna units are mutually orthogonal). The rising edges in a strict tetrahedron, on the other hand, meet each other at less than 90 degrees. Nonetheless the terms tetrahedron and pyramid (and their derivatives) will be used in this specification to refer to any generally pyramidal/tetrahedral-like structure for convenience.

The detectors are positioned at or just above the seafloor (e.g. on a platform or directly on the seafloor). During a survey, the HED transmitter broadcasts an EM signal. EM fields induced at the detectors are picked up by their respective dipole antennae. The detected signals undergo amplification in a signal processing unit within the respective antenna units, and after digitization the amplified signals are output to the data-logging unit 126 to be recorded for later analysis. When surveying is complete, the ballast weight is detached from the remainder of the detector (e.g. by a conventional acoustic release mechanism) so that the floatation device carries the detector (less the ballast weight) to the surface of the water for recovery of the detector, and of the data stored within the data-logging unit 126.

Figure 5:
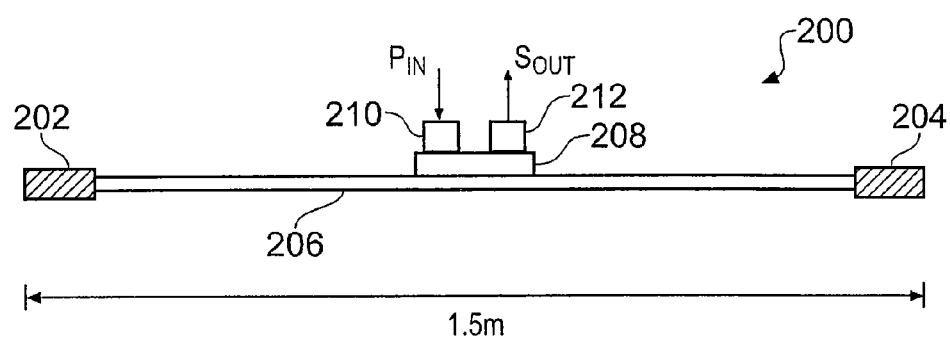
FIG. 5 schematically shows an antenna unit of a detector according to an embodiment of the invention.

FIG. 5 schematically shows an antenna unit 200 for use in a detector according to an embodiment of the invention. The antenna unit comprises a first electrode 202 and a second electrode 204 fixedly attached to a main body 206. The main body has a length in this example such that the electrodes are separated by around 1.5 meters. The electrodes are non-polarisable electrodes, such as silver-silver chloride electrodes of the type conventionally used in marine EM surveying. The electrodes are arranged so as to be exposed to surrounding water when the detector is normally deployed.

Also attached to the main body 206 of the antenna unit 200 (which may also be referred to as a sensing unit) is a signal processing unit 208. The signal processing unit comprises a pre-amplifier circuit in electrical communication with the electrodes 202, 204, and arranged to receive signals therefrom, to amplify the received signals and to convert them to digital form so as to generate output signals. The signal processing unit thus provides measurement channels for electric fields detected by the dipole antennae. The output signals from the signal processing unit may comprise signals indicative of a measured electrical potential of each electrode with respect to a system reference potential, or signals indicative of a potential difference between the electrodes. (The primary parameter of interest in marine EM surveying will generally be a measurement of the electric field between the electrodes, for which potential difference is a direct proxy.) The pre-amplifier may be a standard low noise electric field pre-amplifier of the type conventionally used in marine EM surveying, e.g. as described in U.S. Pat. No. 5,770,945 [5] or by Sinha [6]. The analogue to digital converter (digitizer) may also be conventional. The processing circuit is housed in a waterproof housing which is pressure resistant to the water pressures encountered in normal use.

The electrodes are connected to input terminals of the processing unit by hard-wired connections, i.e. connections that do not include removable plug-and-socket type connectors. Thus a low-impedance connection between the electrodes and the signal processing unit is permanently installed (i.e. a connection which is not readily, and not intended for, routine disconnection between deployments of the instrument). The electrical connection path from the electrodes to their associated input terminals of the processing unit may be provided by conventional cabling which is soldered/brazed to the electrodes and the input terminals. However, in this example the electrical communication between each electrode and its associated input terminal of the signal processing unit is provided by a rigid conductor, e.g. a solid metal rod, which is soldered/brazed to both the electrode and the input terminal. The connection paths from the electrodes to the input terminals may be routed through the housing of the signal processing unit using conventional waterproof pass-through techniques. The solid conductor (or wiring) may, for example, be predominantly silver so as to match the silver-silver chloride electrodes, and so reduce electrochemical potentials in the system. The connection paths may further be screened to reduce interference/noise pick up.

The signal processing unit 208 has a power-in connection port 210 and a signal-out connection port 212. These may be provided by conventional bulkhead connectors. The signal processing unit 208 receives power $P_{in}$ through the power-in connection port 210, e.g. from a central power supply of the data-logging unit of the detector with which the antenna unit 200 is associated, and supplies its output signals $S_{out}$ to the data-logging unit through the signal-out connection port 212. Conventional cabling may be used to route the power supply $P_{in}$ and the post-processed signals $S_{out}$.

The data-logging unit receives the digitized amplified signals for recording. (The data-logging unit may also include additional processing circuitry before the analogue-to-digital conversion stage, e.g. a further amplification stage, or a filtering stage). Including an analog to digital converter in the signal processing unit itself so that the output signals $S_{out}$ are digitized before being routed to the data-logging unit reduces analogue noise pick-up between the antenna unit and the separate data-logging unit. Where the signal processing unit performs the analogue-to-digital conversion, it may be advantageous to provide each antenna unit's signal processing unit with a centrally generated (e.g. in the logging unit) clock signal to assist in time stamping the measurements and helping to ensure the antenna units make measurements in synchrony, if desired. The clock signal (and indeed the digital output signals) may be optically encoded and provided on an optical fibre link.

Figure 6:
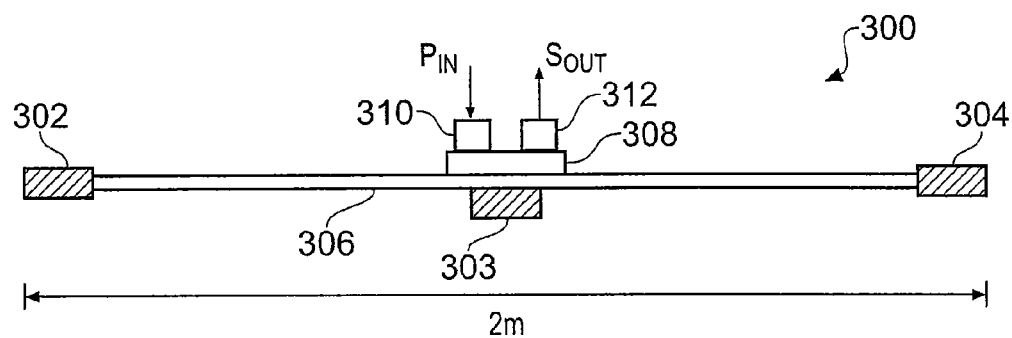
FIG. 6 schematically shows an antenna unit of a detector according to another embodiment of the invention.

FIG. 6 schematically shows an antenna unit 300 for use in a detector according to another embodiment of an aspect of the invention. The antenna unit 300 is broadly similar to the antenna unit 200 shown in FIG. 5, but includes an additional electrode and associated circuitry. Thus the antenna unit 300 comprises a first electrode 302, a second electrode 304, and a third electrode 303 fixedly attached to a main body 306. The antenna unit may thus be referred to as a 3-point or 3-electrode antenna unit. The first and second electrodes 303, 304 are similar to, and will be understood from the first and second electrodes 202, 204 of the antenna unit of FIG. 5. The third electrode 303, and its associated connections, is also similar to, and will be understood, from these electrodes. However, the third electrode is located at a position between the first and second electrodes, in this case towards a midpoint of the main body. The main body is slightly longer in this example such that the first and second electrodes are separated by around 2 meters. The third electrode is thus around 1 meter from each of the other electrodes.

As with the antenna unit 200 of FIG. 5, the antenna unit 300 of FIG. 6 includes a signal processing unit 308 attached to the main body. The signal processing unit 308, and the electrical communication paths from the first, second and third electrodes to it, are similar to and will be understood the corresponding features of the antenna unit 200 of FIG. 5, except for the extension to accommodate the third electrode (i.e. the provision of a further potential or potential difference measurement channel and digitizer channel).

An advantage of including the third electrode 303 is that two measurements of electric field can be made at locations which are separated along a direction parallel to the direction along which the electric field is measured (i.e. one between the first and third electrodes 302, 303, and one between the third and second electrodes 303, 304). Not only does this provide for a level of redundancy, it allows for a determination of the local gradient in the field. This can be useful in some analysis schemes, for example those described in GB 2 411 006 A [9] and GB 2 423 370 A [10], and also potentially for measuring induced polarizations.

The signal processing unit 308 has a power-in connection port 310 and a signal-out connection port 312, which are similar to and will be understood from the corresponding features of the antenna unit 200 shown in FIG. 5, except that the signal-out port 312 now provides for additional output signals associated with the provision of the additional electrode. As before, the output signals may be indicative of the electrical potentials of the electrodes, or of potential differences between pairs of them, e.g. between the first and third, and the third and second, for example.

Figure 7:
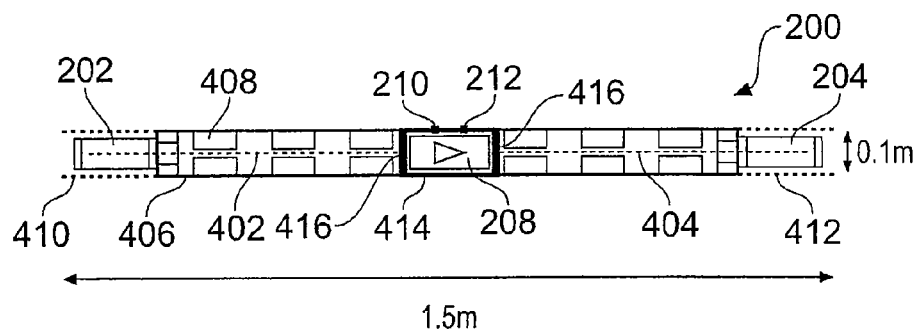
FIG. 7 schematically shows aspects of the construction of the antenna unit FIG. 5.

FIG. 7 is a schematic section view showing constructional features of the antenna unit 200 shown in FIG. 5. The main body of the antenna unit is tubular and comprises a rigid plastic pipe 406 having a length of 1.5 meters and a diameter of 0.1 meters. A number of internal collars 408 are located within the plastic pipe to provide support.

The first and second electrodes 202, 204 are mounted inside the pipe within respective first and second end portions 410, 412 thereof. This provides a degree of mechanical protection for the electrodes. The end faces of the pipe are open so that water can come into contact with the electrodes when the detector is deployed. In addition, the respective end portions 410, 412 of the plastic pipe 406 which are adjacent to/in the vicinity of the electrodes are provided with holes to assist in providing good contact with surrounding water when in use. As noted above, the electrodes are silver-silver chloride (Ag—AgCl) electrolytic electrodes, e.g. as described by Webb [2].

The signal processing unit 208 is located within a central portion of the conduit of the plastic pipe 406. (The signal processing may equally be located off-centre, e.g. in three electrode embodiments where the third electrode is located at the centre within the plastic pipe as for the first and second electrodes.) The signal processing unit is positioned within a pressure resistant housing/casing 414. The pressure resistant housing 414 is provided by a central part of the plastic pipe 406 with internal plugs 416 to either side of the signal processing unit 208. The power-in port 210 and the signal-out port 212 are provided by conventional bulkhead connectors mounted to the central part of the plastic pipe 406 providing the pressure resistant housing 414.

The electrodes 202, 204 are electrically connected to corresponding input terminals of the signal processing units 208 via respective silver rods 402, 404. The silver rods 402, 404 are soldered at one of their ends to their respective electrodes, and at their other end to their respective input terminals of the signal processing unit 208 (measurement channels). The silver rods run through the plastic pipe 406, passing through openings in the support collars 408 and the end plugs 416 of the pressure resistant housing 414. The pass-throughs for the silver rods through the end plugs 416 are water proof/pressure resistant.

The interior of the plastic pipe 406 (apart from the portion comprising the sealed pressure resistant housing 414) may be flooded when deployed (in which case the silver rods may be electrically insulated). Alternatively, the plastic pipe 406 may be sealed with plugs near to the ends (i.e. such that in effect the majority of the pipe comprises a waterproof housing).

Figure 8:
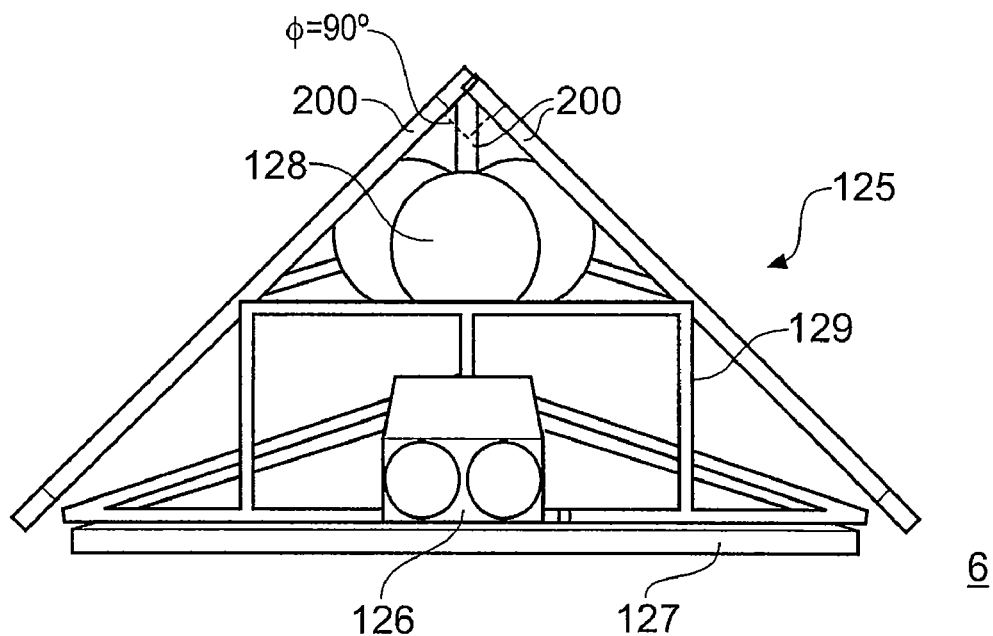
FIG. 8 schematically shows a marine EM detector according to an embodiment of the invention.

FIG. 8 schematically shows the detector 125 shown in FIG. 4 in more detail. The detector 125 incorporates three orthogonally arranged antenna units 200 of the kind shown in FIGS. 5 and 7. The detector 125 is shown in its normally deployed orientation, i.e. the three antenna units are arranged along the rising edges of a tetrahedral-like (triangular pyramid) structure having a triangular base on the seafloor 6. The detector comprises a frame 129 to which the three antennal units 200 are fixed (the main bodies of the antenna units may be considered as comprising parts of the frame). The data-logging unit 126, ballast weight 127, and floatation device 128 are also attached to the frame (the ballast weight detachably so). The ballast weight and the floatation device are separated along a vertical axis of the detector so that the detector naturally tends to assume the orientation shown in FIG. 8, which is the normal deployed orientation for this detector during surveying, as it is dropped through the water column during deployment. The data-logging unit also contains (not shown in the figure) a clock for synchronising data acquisition, a compass and inclinometer so that the orientation of the receiver on the seafloor can be determined, and also a power supply for itself and for the antenna units. The inclusion of a compass and inclinometer to record orientation and inclination on the seafloor can assist in resolving measured field components into desired directions for analysis, e.g. for resolving the measured fields in to horizontal and vertical components.

Each antenna unit 200 is connected (using standard underwater cables/connectors) to the data-logging unit. Because the signals carried by these cables and through their associated connectors have undergone pre-processing (primarily pre-amplification and digitization) in the signal processing units of the respective antenna units, the signals are at a level which makes them less prone to noise pick-up. The use of conventional plug-and-socket connectors for these parts of the signal path allows ready separation of the main detector components, e.g. for maintenance or storage, without being unduly detrimental to performance.

Mounting three antenna units 200 to the frame in the way provides a configuration having improved stability over conventional designs, and thus helps to reduce motionally induced sources of noise. Also, because the antenna units are fixed to the frame, their inclinations and orientations can readily be determined from the inclination and orientation measured for the frame using the on-board inclinometer and compass. This means measured fields/field gradients can be mathematically rotated to any desired coordinate system as required, thus allowing study of both coupled and null coupled components (i.e. TM and TE components). Furthermore still, the detector is more compact than designs having extending booms and so is easier to handle, deploy and recover, as well as to store on ship.

An advantage of mounting the antenna units so that they are all at similar inclinations to the horizontal is that for typical electric fields seen in marine EM surveys (e.g. largely horizontal), all antenna units will nonetheless on average be exposed to similar field strengths. (There will still in general be variations in the signal magnitudes seen along the three different directions which depend on the angular orientation of the detector about a vertical axis compared to the orientation and direction to an electromagnetic source, but none of the dipole antennae biased towards the consistently weaker vertical electric field component.) This would not be the case if one were vertical and the others were horizontally. Similarly, because the antenna units are all at similar inclinations to the horizontal (around 35 degrees in this example), the signal coupling between each antenna to the earth will be the same. This avoids signal differences between channels that are related purely to different coupling coefficients (vertical signals generally couple less well across the seafloor boundary).

Although not shown in FIG. 8, the detector 125 may also be provided with three magnetic field sensors (e.g. induction coils). This may be mounted parallel to the electric field antenna units 200. Magnetic field sensors allow corresponding components of the seafloor magnetic field to be measured in addition to the electric field components. This can be particularly useful if the detector is to be used for MT sounding, in addition to CSEM applications.

Furthermore, it will be understood that the antenna units 200 shown in FIG. 8 could equally be replaced with antenna units 300 of the kind shown in FIG. 6 (i.e. three-electrode antenna units). This would allow field gradients to be measured along the three orthogonal directions with which the antenna units are aligned. The gradients can then be resolved into gradients along desired directions for analysis (e.g. vertical, radial and azimuthal, or vertical and two orthogonal horizontal directions).

Although not shown in FIG. 8, the electrodes at the ends of the of the antenna units which are uppermost in the figure are electrically connected together so that they in effect comprise a single electrode. In embodiments of some aspects of the invention, however, these electrodes are not interconnected. The effects of electrically coupling the electrodes together in this way are discussed further below in connection with the detector shown in FIG. 9.

To summarise the detector design shown in FIG. 8 (and also FIG. 9 described below), there are a number of advantages than can be achieved in embodiments of some aspects of the invention. Rigid mounting means that the orientations of the dipole antennae provided by the antenna units can be measured more accurately, thus allowing more accurate field decompositions than are typically currently possible. Connector noise and motional noise can be substantially reduced allowing smaller signals from the source to be detected. The detector can be easily modified to make gradient measurements, either using 3-point measuring systems (antenna units), or through the use of a rigidly mounted parallel and aligned pairs of antenna units. Since the pre-amplifier is an integral part of the antenna unit in some embodiments, a multi channel logger can be used to record signals from an array of sensors, each of which has a known location and orientation. These could be cabled back to a central location to provide real time data from the array.

Figure 9:
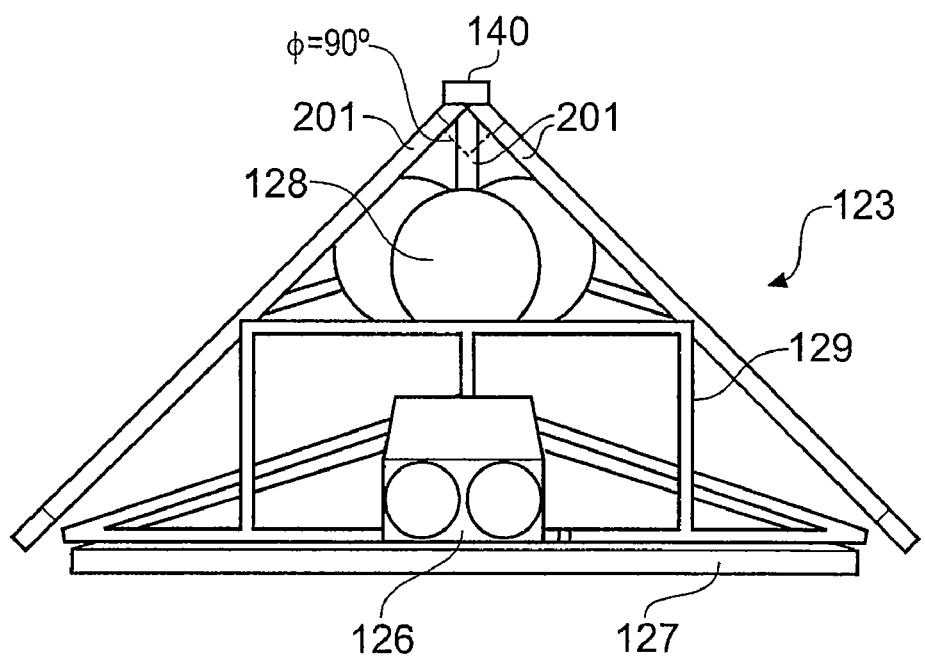
FIG. 9 schematically shows a marine EM detector according to another embodiment of the invention.

FIG. 9 schematically shows a marine EM detector 123 according to another embodiment of an aspect of the invention. The detector 123 shown in FIG. 9 may be considered as a modified version of the detector 125 shown in FIG. 8 and may be equally be employed in a survey as shown in FIG. 4 but with detectors 125 shown in FIG. 4 replaced with detectors 123 of the kind shown in FIG. 9. Features of the detector 123 which are similar to and will be understood from corresponding features of the detector 125 shown in FIG. 8 are indicated by the same reference numeral. However, the detector 123 shown in FIG. 9 differs from that shown in FIG. 8 in that it employs modified antenna units 201. These modified antenna units 201 are individually broadly similar to the antenna units 200 of the detector 125 of FIG. 8 (and shown in FIGS. 5 and 7), but are arranged so that one of their electrodes is a unitary shared common electrode 140 (instead of separate electrode elements connected together to provide a single electrode as in FIG. 8). Thus each antenna unit 201 comprises a first and a second electrode, but the second electrodes are common to the second electrodes of the other antenna units. This is possible because the electrodes at the ends of the antenna units which are closest to the top the apex of the tetrahedral structure are all at a similar location, and so can be replaced with a single measurement at that location using the common electrode 140. This helps to improve consistency between channels. Furthermore, in detectors based on recording the electric potential of the individual electrodes so that potential differences (electric fields) can be determined later, the approach of using a common electrode also has the advantage of reducing the number of measurement channels required (e.g. from six for a detector having independent electrodes associated with each of three dipoles, to four for the detector 123 in FIG. 9). In cases where differential measurements are recorded between the respective pairings of the four electrodes comprising the three dipole antennae, three differential measurements provided (the same as if the electrodes of each dipole antenna were independent of the electrodes of the other dipole antennae). Apart from the differences in specific electrode design, the detector 123 in FIG. 9 is otherwise similar to that of FIG. 8.

Although the above-described detectors are of a tetrahedral-like configuration, it will be appreciated that the antenna units in detectors according to other embodiments of the invention could equally be arranged in a number of other ways. E.g. detectors could be arranged so that when normally deployed, the electrode configuration is such that the electric dipole orientations are inverted with respect to those shown in FIGS. 8 and 9 (i.e. in effect such detectors are similar to those shown in FIGS. 8 and 9 but are deployed in an "up-side down" orientation compared to the orientations shown in FIGS. 8 and 9). However, this configuration is less likely to be as stable and/or as compact as the detectors shown in FIGS. 8 and 9 because the widest part of the antenna portions of the detectors is no longer at the bottom. Furthermore, the detectors may not be aligned orthogonally. However, this may introduce analysis complexity caused by cross-coupling between channels when seeking to resolve the measured signals along axes of a desired co-ordinate system for analysis.

Detectors/receivers according to embodiments of the invention may be used for a range of survey applications, for example, for exploration (searching) purposes and for monitoring purposes. Furthermore, the detectors may be used in surveys based both on active (CSEM) and/or passive (MT) techniques.

For example, for exploration purposes, the detectors can be used for conventional CSEM surveying in the field of hydrocarbon exploration as described (for example) by Srnka et al [11], Moser et al. [12] and MacGregor et al. [13], and in GB 2 382 875 A [1].

Figure 10A:
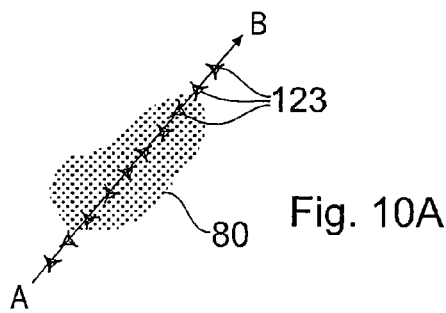
FIGS. 10A, 10B and 10C schematically show in plan view examples of methods of surveying using detectors according to embodiments of the invention.
Figure 10B:
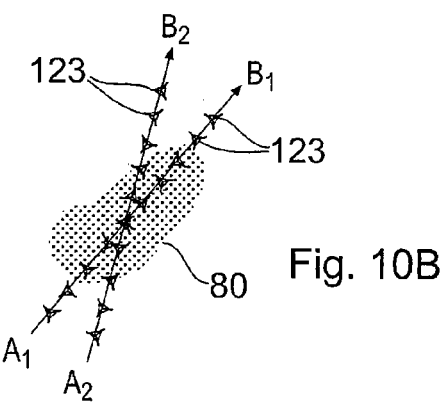
Figure 10C:
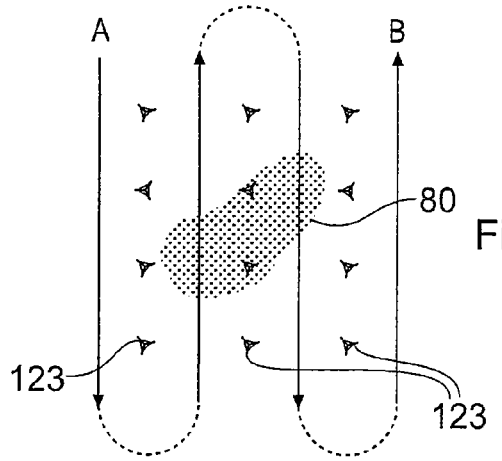

FIGS. 10A, 10B and 10C schematically show in plan view examples of methods of surveying using detectors according to embodiments of the invention. In each case the survey is made over an area of seafloor above a hydrocarbon reservoir 80.

FIG. 10A shows what might be referred to as a single-line survey. This relatively simple survey method might, for example, be appropriate for determining the content of a known prospect. For example to determine whether a previously identified subterranean geological structure contains resistive hydrocarbon or conductive seawater. In this case a simple resistive or non-resistive determination is all that is required and so a relatively simple survey may suffice. In FIG. 10A an array of receivers 123 (typically around 15 to 40 of them) are deployed along a line over the region of interest, with a typical spacing of perhaps 500 m to 2000 m between neighbouring detectors. A source, e.g. an HED transmitter as shown in FIG. 4, is towed in a pass over the detectors from A to B. Data from the detectors recorded during the tow may be mathematically resolved into field components along horizontal and orthogonal components for different source-detector offsets presented during the survey. The data may then be analysed according to known techniques, e.g. geophysical inversion techniques, or wave-field imaging (migration) techniques. Typically for an HED source, the data at each detector will be resolved into a first ("in-line") horizontal component which is parallel to the tow path (i.e. parallel to the source dipole axis), and a second ("cross-line") component which is orthogonal thereto, and often a vertical component also. The "cross-line" component would be zero in a purely one-dimensional isotropic earth. Any deviation of this component from zero therefore provides valuable information on higher dimensionality in the subterranean strata and/or resistive anisotropy. Because this component is typically very much smaller in magnitude than the in-line (coupled) component, an accurate knowledge of receiver orientation is required to resolve it properly. This is thus one area where the improved orientation information available for detectors according to embodiments of the invention is most useful.

FIG. 10B shows what might be referred to as a two-line survey. In FIG. 10B an array of receivers 123 according to embodiments of the invention are deployed along two lines over a region of interest. Each individual line array may be similar to the line array of FIG. 10A. A source, e.g. an HED transmitter as shown in FIG. 4, is towed in two passes over the detectors, one pass from $A_1$ to $B_1$ and one pass from $A_2$ to $B_2$ (or in the opposite directions for either). Data from the detectors 123 recorded during the tows may be mathematically resolved into field components along horizontal and orthogonal components for different source-detector offsets and offset orientations. This approach has the advantage that at different points in the survey, detectors variously present different offset orientations (i.e. in-line, broad-side and in-between). Thus this survey method present so-called multi-geometry data. The additional information provided by multi-geometry data can help better constrain the subterranean strata determined from analysis of the data [1].

FIG. 10C shows another example survey method. Here detectors 123 according to embodiments of the invention are arrayed over the area of interest in a grid-like pattern. A source, e.g. an HED transmitter as shown in FIG. 4, is towed to make repeated passes over the array of detectors along a path between A to B. This survey method also provides comprehensive multi-geometry data. Although the example is based on a square receiver grid, it will be understood that a wide variety of receiver placements may be used. For example other high symmetry regular grids, such as triangular or rectangular, may be used. In addition irregular grids may be used that have no high level of symmetry.

As noted above, detectors according to embodiments of the invention could also be used for monitoring purposes as well as for exploration purposes, e.g. to monitor changes in the properties of a reservoir during production. Thus it will be understood that whilst the above description has primarily referred to a towed transmitter and remotely deployable detectors, the detectors could also be used in a fixed installation. For example, they could be used in a method to monitor changes to a hydrocarbon reservoir from which hydrocarbon is being drawn. In such cases it may be appropriate to employ one (or more) transmitter(s) (which may be HED transmitters or any other form of transmitter, e.g. a vertical electric dipole (VED) transmitter or a ring electrode transmitter) in fixed positions relative to an array of detectors. The transmitter(s) and/or detector(s) could be anchored to the seafloor or suspended from an oil-rig or other platform, for example. In other embodiments, the transmitter(s) and/or detector(s) could be placed in a horizontal well or borehole, e.g. a geotechnical borehole. In the case of a producing oil field, the subterranean structures are likely to be well known already from prior geophysical surveys and drilling results. Indeed, prior geophysical and geological information from the oil field can be used to construct a background model to assist in analysing data from the detectors.

Figure 11A:
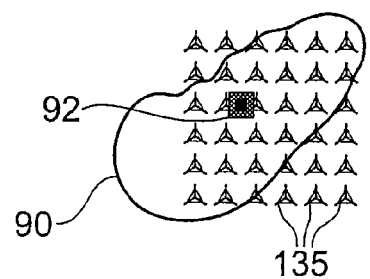
FIGS. 11A and 11B schematically shows in plan view examples of methods for monitoring a hydrocarbon producing reservoir using an detectors according to embodiments of the invention.

FIG. 11A schematically shows in plan view a scheme for monitoring a hydrocarbon producing reservoir 90 using an array of detectors 135 according to embodiments of the invention. A fixed source 92 in the form of a vertical electric dipole (VED) is located within the array (e.g. attached to a producing well or other platform). The VED may, for example, be similar to that described in GB 2 390 904 A [14]

or WO 04/053528 A1 [15]. Detectors 135 are equipped with both electric (E) and magnetic (B) field antennae and are deployed in a square grid on the seafloor over the producing reservoir. Typical grid dimensions might be such that neighbouring detectors have separations of around 100 m-1000 m, and the array covers and goes slightly beyond an assumed extent of the reservoir at the start of monitoring. The detectors might be self-contained remotely deployable units, or (more preferably for monitoring) could be cabled back to a rig in the field to allow real time collection and analysis of both the CSEM and MT data. The VED source 92 may be switched on periodically and signals from each of the receivers measured and used to determine the lateral and vertical extent of the reservoir, its properties, and changes in these parameters over time.

Figure 11B:
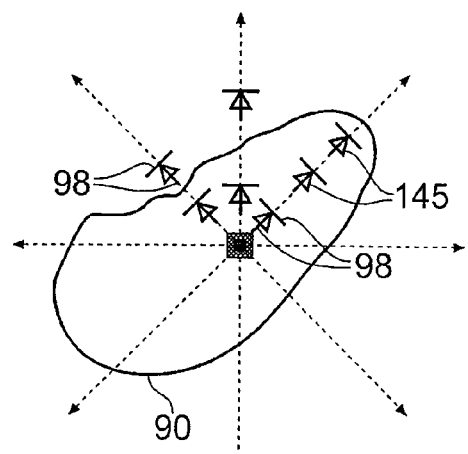

FIG. 11B schematically shows in plan view a scheme for monitoring a hydrocarbon producing reservoir 90 using an array of detectors 145. In this case the detectors 145 are arranged in radial arrays extending away from a producing rig 96 on which a VED source transmitter is mounted. The detectors 145 comprise 3-electrode antenna units of the type shown in FIG. 5. Thus electric field gradients may be obtained along the axes of the detector and then resolved into radial and azimuthal components (with respect to the source), as schematically indicated in the Figure by the orientations of "virtual antennae" 98 shown at each detector location. In this example the detectors are cabled to the rig to allow real time collection and analysis of the data. The VED source is energised at the rig, and the gradients of the electric field, which are particularly sensitive to lateral changes in structure, are measured across the array and used to determine the extent and properties of the reservoir and changes in these parameters over time. Determining both radial and azimuthal gradient components allow TE/TM mode signal decomposition of the kind described in GB 2 411 006 A [9] and GB 2 423 370 A [10]. This will allow both a TM mode component (sensitive to the reservoir) and a TE mode component (sensitive to the background structure and so useful for constraining the large scale strata) to be derived.

During surveying, transmitter and receiver positions can be determined using standard long and/or short and/or ultra-short baseline acoustic navigation systems and processed to determine the horizontal separation and/or offset direction between the transmitter and receiver.

FIG. 12 is a schematic view of an oil rig 140 producing hydrocarbon. The oil rig is located in the vicinity of a region of interest which has been surveyed using detectors described above. Here the results of an analysis of the data obtained using the detectors have identified a subterranean hydrocarbon reservoir 12 within the region of interest. The identified hydrocarbon reservoir has been penetrated by a hydrocarbon-producing well 142 carried by the oil rig 140. Hydrocarbon (e.g. oil) may be produced from the well 142 (i.e. extracted/recovered from the reservoir 12) using conventional techniques.

FIG. 13 is a schematic perspective view of a barrel containing a volume of hydrocarbon 144. The hydrocarbon is produced using the well 142 shown in FIG. 12.

FIG. 14 is a schematic perspective view of a data storage medium 146 bearing a data set. The data set is obtained during a survey using the detectors described above. The data storage medium in this example is a conventional optical disc, e.g. a data compact disc or data DVD disc. Any other storage medium may equally be used. Thus data sets obtained using the above-described detectors may be stored on the data storage medium 146 for later analysis.

Finally, it will be understood that the invention is equally applicable to surveying of freshwater, for example large lakes or estuaries, so that references to seafloor, seawater etc. should not be regarded as limiting and should be interpreted as covering lakebed, riverbed etc. Indeed the applicability of the invention to shallow water makes it ideal for surveying shallow lakes.

Thus a detector for underwater electromagnetic surveying is described. The detector comprises first, second, third and fourth electrodes which are arranged to define first, second and third electric dipole antennae extending between pairs of the electrodes. Each dipole antennae extends between a pair of the electrodes and the fourth electrode is common to all three dipole antennae. Thus the first electrode is separated from the fourth electrode along a first direction to provide the first dipole antenna, the second electrode is separated from the fourth electrode along a second direction to provide the second dipole antenna, and the third electrode is separated from the fourth electrode along a third direction to provide the third dipole antenna. The electrodes are arranged so that the first, second and third directions are inclined at an angle of between 20 and 70 degrees to a surface on which the detector rests when in normal use.

REFERENCES

[1] GB 2382875 A
[2] Webb, Constable, Cox & Deaton, 1985, A seafloor electric field instrument, J. Geomag & GeoElectr., 37, 1115-1129
[3] Constable & Cox, 1996, Marine Controlled source electromagnetic sounding II: The PEGASUS experiment, J. Geophys. Res., 101, 5519-5530
[4] WO 03/104844 A1
[5] U.S. Pat. No. 5,770,945
[6] Sinha, Patel, Unsworth, Owen & MacCormack, 1990, An active source EM sounding system for marine use, Mar. Geophys. Res., 12, 59-68
[7] GB 2 402 745 A
[8] WO 06/026361 A1
[9] GB 2411006 A
[10] GB 2423370 A
[11] Srnka, L., Carazzone, J., Ephron, M. and Eriksen, E., 2006, Remote reservoir resistivity mapping, The Leading Edge, 25, 972-975
[12] Moser, J., Poupon, M., Meyer, H., Wojcik, C., Rosenquist, M., Adejonwo, A. and Smit, D., 2006, Integration of electromagnetic and seismic data to assess residual gas risk in the toe thrust belt of the deepwater Niger delta, The Leading Edge, 25, 977-982
[13] MacGregor, L., Andreis, D., Tomlinson, J. and Barker, N. [2006], Controlled source electromagnetic imaging on the Nuggets-1 reservoir, The Leading Edge, 25, 984-992
[14] GB2390 904 A
[15] WO 04/053528 A1

What is claimed is:

1. A detector for underwater electromagnetic surveying, comprising:
    first, second, third and fourth electrodes arranged to define first, second and third electric dipole antennae, the dipole antennae respectively extending between pairs of the electrodes, wherein the first electrode is separated from the fourth electrode along a first direction to provide the first dipole antenna, the second electrode is separated from the fourth electrode along a second direction to provide the second dipole antenna, and the third electrode is separated from the fourth electrode along a third direction to provide the third dipole antenna, and wherein the electrodes are arranged so that the first, second and third directions are inclined at an angle of between 20 and 70 degrees to a horizontal plane when the detector is in normal use.

2. A detector according to claim 1, wherein the electrodes are arranged so that the first, second and third directions are inclined at an angle within a range selected from the group comprising 30 to 60 degrees, 25 to 50 degrees, and 30 to 40 degrees to the horizontal plane when the detector is in normal use.

3. A detector according to claim 1, wherein the electrodes are arranged so that the first, second and third directions are inclined at substantially the same angle to the horizontal plane when the detector is in normal use.

4. A detector according to claim 1, wherein the electrodes are arranged so that the first, second and third directions are inclined at around 35 degrees to the horizontal plane when the detector is in normal use.

5. A detector according to claim 1, wherein the electrodes are arranged so that the first, second and third directions are orthogonal to one another.

6. A detector according to claim 1, further comprising a plurality of measurement channels to which the electrodes are coupled.

7. A detector according to claim 6, wherein the plurality of measurement channels comprise first, second, and third potential difference measurement circuits operable to respectively measure the potential difference between the first and fourth electrodes, the second and fourth electrodes, and the third and fourth electrodes.

8. A detector according to claim 6, wherein the plurality of measurement channels comprise first, second, third and fourth electric potential measurement circuits operable to respectively measure the electric potential of the first, second, third and fourth electrodes.

9. A detector according to claim 6, wherein the electrodes are coupled to the measurement channels by an electrical connection path that does not include detachable plug-and-socket connectors.

10. A detector according to claim 6, wherein the electrodes are coupled to the measurement channels by cables soldered to the electrodes and to corresponding input terminals of the measurement channels.

11. A detector according to claim 6, wherein the electrodes are coupled to the measurement channels by solid conductors soldered to the electrodes and to corresponding input terminals of the measurement channels.

12. A detector according to claim 6, wherein the electrodes are electrically coupled to the measurement channels by a material which is matched to the electrodes.

13. A detector according claim 12, wherein the electrodes have a surface formed from silver-silver chloride and the material connecting them to the signal processing unit is silver.

14. A detector according to claim 1, wherein the dipole antennae have lengths of between 0.5 and 5 meters.

15. A detector according to claim 1, wherein the dipole antennae have lengths of between 1 and 2 meters.

16. A detector according to claim 1, wherein detector comprises a frame having a substantially pyramidal form, wherein the electrodes are mounted towards vertices of the frame.

17. A detector according to claim 16, wherein the fourth electrode is mounted towards an uppermost vertex of the frame when the detector is in normal use.

18. A detector according to claim 1, further comprising a fifth electrode mounted between the first and fourth electrodes.

19. A detector according to claim 18, further comprising a sixth electrode mounted between the second and fourth electrodes.

20. A detector according to claim 19, further comprising an seventh electrode mounted between the third and fourth electrodes.

21. A detector according to claim 1, further comprising magnetic field sensors for measuring magnetic fields.

22. A detector according to claim 1, further comprising an inclinometer arranged to allow an inclination of the respective first, second and third directions to a horizontal direction to be determined.

23. A detector according to claim 1, further comprising a compass arranged to allow an orientation of the respective first, second and third directions about an axis of the compass to be determined.

24. A method for obtaining hydrocarbon from an area that contains a subterranean hydrocarbon reservoir, comprising:
providing survey data from an electromagnetic survey of the area performed using a detector according to claims 1;
analyzing the survey data to identify the subterranean hydrocarbon reservoir;
penetrating the subterranean hydrocarbon reservoir with a hydrocarbon-producing well; and
extracting hydrocarbon from the subterranean hydrocarbon reservoir using the hydrocarbon-producing well.

25. A marine electromagnetic survey method comprising:
deploying a detector operable to measure electric fields along first, second and third directions inclined at an angle of between 20 and 70 degrees to a horizontal plane, wherein the detector comprises first, second, third and fourth electrodes arranged so that the first electrode is separated from the fourth electrode along the first direction to allow for the measurement of electric field along the first direction, the second electrode is separated from the fourth electrode along the second direction to allow for the measurement of electric field along the second direction, and the third electrode is separated from the fourth electrode along the third direction to allow for the measurement of electric field along the third direction;
transmitting an electromagnetic source signal from a source location; and
measuring resulting electric fields along the first, second and third directions at the detector.

* * * * *